US008943878B2

(12) United States Patent
Collet

(10) Patent No.: US 8,943,878 B2
(45) Date of Patent: Feb. 3, 2015

(54) METHOD AND DEVICE FOR DETECTING THE BLOCKAGE OF A GASOLINE VAPOR FILTER PURGE VALVE

(75) Inventor: Thierry Collet, Fontenilles (FR)

(73) Assignees: Continental Automotive France, Toulouse (FR); Continental Automotive GmbH, Hanover (DE)

( * ) Notice: Subject to any disclaimer, the term of this patent is extended or adjusted under 35 U.S.C. 154(b) by 227 days.

(21) Appl. No.: 13/583,668

(22) PCT Filed: Apr. 5, 2011

(86) PCT No.: PCT/EP2011/001679
§ 371 (c)(1),
(2), (4) Date: Sep. 10, 2012

(87) PCT Pub. No.: WO2011/124358
PCT Pub. Date: Oct. 13, 2011

(65) Prior Publication Data
US 2013/0000395 A1 Jan. 3, 2013

(30) Foreign Application Priority Data
Apr. 8, 2010 (FR) ..................................... 10 01458

(51) Int. Cl.
*G01M 15/04* (2006.01)
*F02M 25/08* (2006.01)

(52) U.S. Cl.
CPC ................................ *F02M 25/0827* (2013.01)
USPC ...................................................... 73/114.39

(58) Field of Classification Search
USPC ........................... 73/47, 49.7, 114.38, 114.39
See application file for complete search history.

(56) References Cited

U.S. PATENT DOCUMENTS 4,794,790 A 1/1989 Margarit-Metaxa
6,698,280 B1 3/2004 Iden et al.
2004/0040537 A1 3/2004 Esteghlal et al.
2004/0226353 A1* 11/2004 Yamaguchi et al. ......... 73/118.1
2004/0231404 A1* 11/2004 Yamaguchi et al. ......... 73/118.1
2005/0015194 A1 1/2005 Hassdenteufel et al.
2005/0050949 A1 3/2005 Esteghlal et al.
2005/0126639 A1 6/2005 Ens et al.
2008/0245347 A1 10/2008 Collet
(Continued)

FOREIGN PATENT DOCUMENTS

CN 1450962 A 10/2003
CN 1662764 A 8/2005
(Continued)

OTHER PUBLICATIONS

International Search Report dated May 10, 2011, corresponding to PCT/EP2011/001679.

*Primary Examiner* — Eric S McCall
(74) *Attorney, Agent, or Firm* — Young & Thompson

(57) ABSTRACT

A method for detecting the blockage of a gasoline vapor filter (3) bleed valve (4) for a motor vehicle internal combustion engine (1), includes at least one sequence of the following steps: a step of controlling the opening of the bleed valve (4), a step of measuring at least one operating parameter of the internal combustion engine (1), which is related to the mixture taken into the engine, a step of calculating an indicator, via statistical signal-processing on at least one measured parameter, and of comparing the indicator to a predetermined value. A detection device capable of implementing the method is described.

12 Claims, 1 Drawing Sheet

(56) References Cited

U.S. PATENT DOCUMENTS

| | | | | |
|---|---|---|---|---|
| 2010/0162804 | A1 | 7/2010 | Grunwald et al. | |
| 2013/0041539 | A1* | 2/2013 | Collet | 701/22 |
| 2013/0081599 | A1* | 4/2013 | Collet | 123/520 |

FOREIGN PATENT DOCUMENTS

| | | | |
|---|---|---|---|
| DE | 36 24 441 | | 1/1988 |
| DE | 100 03 223 | | 10/2001 |
| DE | 103 24 813 | | 1/2005 |
| DE | 10 2005 045434 | | 3/2007 |
| DE | 10 2005 049068 | | 4/2007 |
| DE | 10 2008 063758 | | 7/2010 |
| EP | 2 199 586 | | 6/2010 |
| FR | 2 900 981 | | 11/2007 |
| JP | 2000345927 | A | 12/2000 |
| JP | 2005248911 | A | 9/2005 |
| WO | 02/18165 | | 3/2002 |
| WO | 03/033901 | | 4/2003 |

* cited by examiner

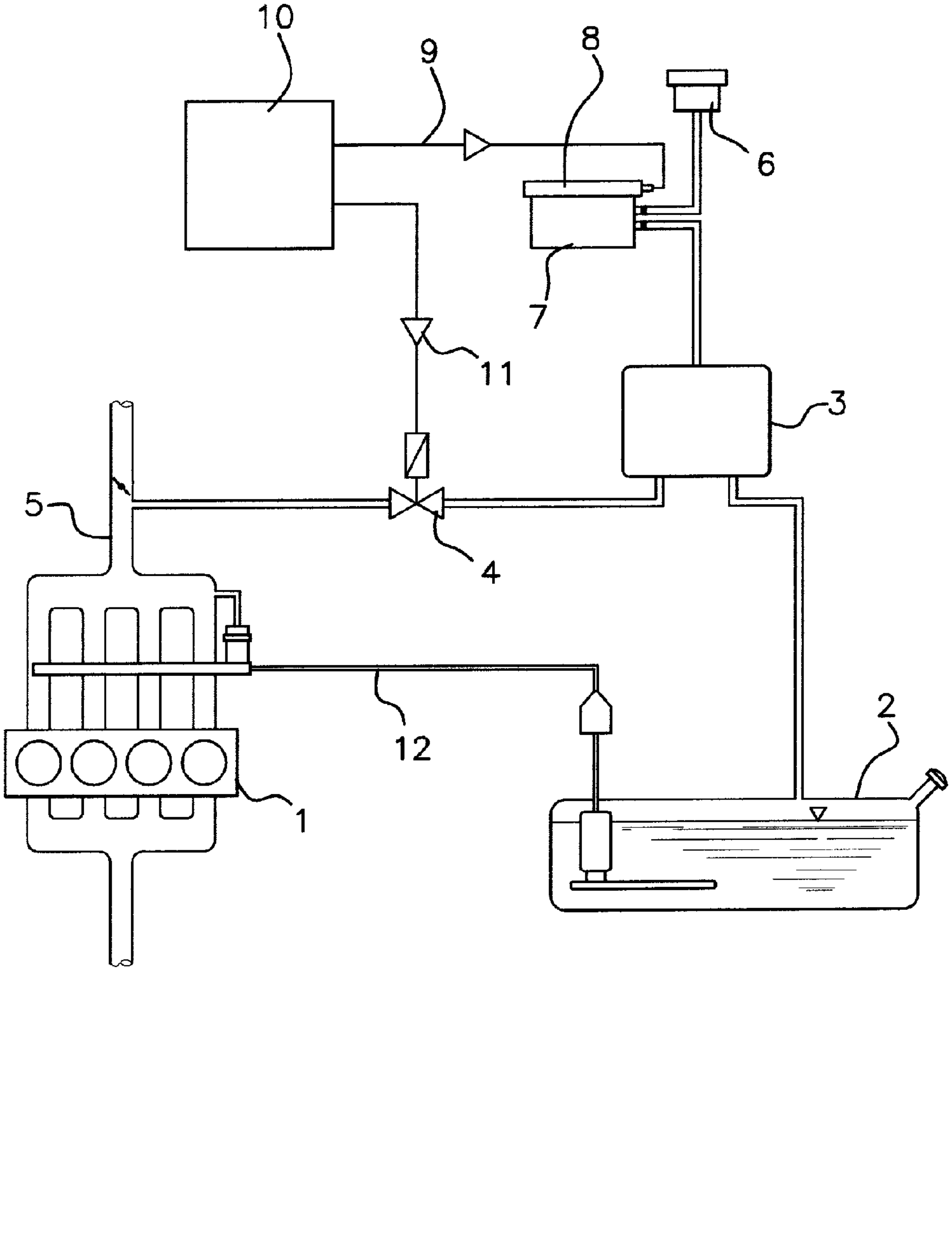
10
9
8
6
7
11
3
5
4
12
2
1

METHOD AND DEVICE FOR DETECTING THE BLOCKAGE OF A GASOLINE VAPOR FILTER PURGE VALVE

BACKGROUND OF THE INVENTION

The invention relates to the field of vehicle drive systems. It relates more specifically to the detection of faults in the circuit of the gasoline vapor filter (also known as "canister") that is fitted to vehicles equipped with an internal combustion gasoline engine.

For many years, with a view, amongst other things, to reduce the pollution generated by gasoline engine vehicles, and at the same time to reduce their fuel consumption, the fuel tanks of these vehicles have been fitted with a device that recovers the gasoline vapors and reinjects them into the engine. This device, usually known to those skilled in the art as a canister, is situated near to the gasoline tank. It comprises a charcoal filter which fixes the gasoline vapors, notably when the engine is at a standstill. The injection of the vapors into the engine via the inlet pipe is commanded by the engine control unit (ECU) which enables the opening and closing of a purge valve.

Current standards in certain countries require the ability to detect the presence of leaked gasoline vapors in a vehicle. This entails diagnosing all possible leaks and faults of the components involved, notably the gasoline vapor filter (canister) and the purge valve.

Methods for detecting the operation of the purge valve using a test performed when the vehicle is at idle are known from the prior art. In these methods, a series of openings and closings of the purge valve are commanded, over a period of around ten seconds. If the valve is operational, then the admission of gasoline vapor to the engine should result in a change in various operating parameters such as the richness of the mixture, the torque, the engine speed, the inlet pressure, etc. The methods then detect whether one of these parameters, which may depend on the vehicle concerned, varies beyond a predetermined threshold, and this variation then validates correct operation of the vapor filter purge valve. Such a method is, for example, described in patent application FR 2 900 981 in the name of Siemens VDO Automotive.

BRIEF SUMMARY OF THE INVENTION

This method does, however, entail keeping the engine speed at low idle for a few seconds, which limits its implementation while the vehicle is being used.

It is therefore an object of the present invention to propose a device that solves the abovementioned problem.

It is a second object of the invention to be simple and inexpensive to implement.

To this end, the invention is aimed at a method for detecting the blockage of a purge valve of a gasoline vapor filter for a vehicle internal combustion engine; the method comprises at least one sequence of the following steps:

- a step of changing the state of the purge valve,
- a step of measuring at least one operating parameter of the internal combustion engine which parameter being connected with the mixture admitted to said engine,
- a step of calculating an indicator, by statistical signal processing of at least one measured parameter, and of comparing this indicator against a predetermined value.

According to one first implementation of the invention, the step of calculating an indicator is a step of calculating correlation, over a predetermined period of time, between the measured parameter and the state of the purge valve and of determining whether the calculated correlation is above a predetermined threshold.

According to another implementation of the invention, the step of calculating an indicator comprises a step of measuring the level of noise observed on at least one operating parameter of the engine connected with the mixture admitted to said engine, before and after a change in state of the purge valve.

For preference, in this second case, the method includes filtering the level of noise on a studied parameter then integrating this level of noise, over a determined duration after a change in state of the purge valve, then comparing this integrated value against a predetermined threshold.

According to a preferred implementation, the method includes repeating the steps as described above in order to obtain a measurement that is statistically significant.

According to various provisions that can be used in conjunction with one another:

- operating parameter of the internal combustion engine is measured at an air intake manifold of the engine,
- operating parameter of the internal combustion engine is measured using a lambda probe.

The invention is also aimed at a device for detecting the blockage of a purge valve of a gasoline vapor filter of a vehicle internal combustion engine, said device comprising:

- means for measuring at least one operating parameter of the internal combustion engine, which parameter being connected with the mixture admitted to said engine,
- means of comparing values of the measured parameter before and after a change in state of the purge valve and of determining whether the variation in said parameter is above a predetermined threshold.

For preference, the means for measuring at least one operating parameter of the internal combustion engine comprise at least one sensor positioned at an air intake manifold of the engine.

-BRIEF DESCRIPTION OF THE DRAWINGS

The objects and advantages of the invention will be better understood from reading the following description relative to the drawings of one particular embodiment, given by way of non-limiting example, in which:

FIG. 1 is a schematic view of the layout of the purge valve of the gasoline vapor filter within an internal combustion engine.

DETAILED DESCRIPTION OF THE INVENTION

In the present example, the invention takes place in a land vehicle such as an automobile.

The vehicle, which is not depicted in FIG. 1, comprises an internal combustion engine 1 supplied with fuel contained in a fuel tank 2. The internal combustion engine 1 comprises an air intake manifold 5 and a fuel inlet pipe 12 which is connected to the fuel tank 2.

To collect fuel vapors emanating from the fuel tank 2, the latter is connected to a vapor filter 3, which is connected to the air intake manifold 5 via a purge valve 4. the purge valve 4 is able on command to place the vapor filter 3 in communication with the air intake manifold 5 of the internal combustion engine 1 so that at least some of the fuel vapors contained in the vapor filter 3 can be recycled.

The vapor filter 3 is also in communication with an air intake 6 via a vent and a vent valve 7 (known as an NVLD which stands for "natural vacuum leak detector") which are capable of placing the vapor filter 3 and the air intake 6 in communication. The vent valve 7 opens when the pressure in the vapor filter 3 exceeds a certain threshold or drops below a certain threshold. This happens for example when the purge valve 4 is open and the internal combustion engine 1 is running. The vacuum thus created in the air intake manifold 5 aspirates the fuel vapors contained in the vapor filter 3 and causes the vent valve 7 to open. Air then passes through the vapor filter 3 and becomes laden with fuel vapor before entering the air intake manifold 5.

The vent valve 7 also comprises a pressure switch 8 able to switch a signal according to the level of vacuum in the vapor filter 3. The pressure switch 8 delivers its signal via a line 9 to control electronics 10 which may be dedicated to the system or shared with other parts of the vehicle such as the internal combustion engine 1. The control electronics 10 are able to control the opening and closing of the purge valve 4 via a control line 11.

In this example, the method for detecting the blockage of a purge valve is implemented under engine part load conditions, which means when the engine is neither at idle nor at maximum power.

In normal operation, as soon as the fuel vapors in the vapor filter 3 reach a certain pressure, the purge valve 4 opens automatically. It closes again when the pressure drops below a predetermined threshold.

The method for detecting the blockage of a purge valve 4 of a gasoline vapor filter 3 comprises several steps:

changing the state of the purge valve 4 (possibly following a command from the control electronics 10), receipt of and storage by the control electronics 10 of successive values for certain parameters which have been measured. These parameters can be measured at the air intake manifold 5, for example the pressure and/or the temperature in said manifold 5, the air mass flow rate, etc., using sensors known to those skilled in the art. It may also be other engine operating parameters connected with the mixture admitted, for example the richness of the mixture, which parameters being picked up by a lambda probe, likewise of known type. These measurements are, for example, acquired every half second for a certain period of time, for example 10 seconds or so. The measurement duration is dependent on the engine in question and on its operating point. It is predetermined and stored in the control electronics 10.

calculating the correlation between the states of the purge valve 4 and the variations in certain of the stored parameters, and comparing this correlation against a predetermined threshold.

It will appreciated that when the purge valve 4 opens, which causes an additional influx of air and of fuel vapors to be admitted to the engine, a change in certain operating parameters of the internal combustion engine 1 ought to be observed. The method therefore here uses a comparison between a signal observed prior to the opening of the purge valve 4 and this same signal after said purge valve 4 has been opened. This comparison is made by correlating the measured parameter with the state of the purge valve 4.

Two cases then arise:

1/ Either the purge valve 4 is blocked (in the open or closed position). In that case, there is no correlation (or the correlation is below a predetermined threshold) between the state of the purge valve 4 and the observed signals.

The control electronics 10 then record parameters of which the correlation with the purge valve state change phases is below a predetermined threshold, and this therefore characterizes faulty operation of the purge valve 4.

2/ Or the purge valve 4 operates correctly. In that case, a correlation between the changes in state of the purge valve 4 and certain operating parameters of the internal combustion engine 1 is observed. The control electronics calculate a correlation that is higher than a predetermined threshold, thus characterizing a valve that is operational.

It will be appreciated that the method as has just been explained offers several advantages.

Measuring the correlation between the variations in a measured parameter and the state of the purge valve 4 provides a detection which is far more sensitive than simply observing a parameter, because of the high level of noise observed on the operating parameters of the internal combustion engine 1 when the latter is not running at idle.

The method makes it possible to detect a fault with the purge valve 4 without requiring the engine to run for lengthy periods at idle, unlike the methods of the prior art.

The method can be applied to any internal combustion engine 1, including one used in a hybrid vehicle, at any operating speed.

This method can be used to supplement other methods for detecting the blockage of the purge valve 4.

The scope of the present invention is not restricted to the details of the embodiments considered hereinabove by way of example but on the contrary extends to cover modifications that are within the competence of the person skilled in the art.

In an embodiment variant, the control electronics 10 control one or more cycles of opening and closing the purge valve 4 and record the measured parameters.

In an embodiment variant, the control electronics 10 measure the level of noise observed on at least one operating parameter of the internal combustion engine 1 connected with the mixture admitted to said engine, before and after a change in state of the purge valve 4.

This is because if the purge valve 4 is operational, the level of noise increases significantly when it is open, because an additional volume of mixture is being admitted to the internal combustion engine 1. The factor by which the noise level changes may actually be as high as 5 or 6 when the purge valve 4 is open.

The method then for example employs filtering of the level of noise on a studied parameter, then integrates this noise level, possibly averaged, over a determined period of time after a change in state of the purge valve 4, and then compares this integrated value against a predetermined threshold.

The invention claimed is:

1. A method for detecting blockage of a purge valve of a gasoline vapor filter for a vehicle internal combustion engine, the method comprising at least one sequence of the following steps:

changing a state of the purge valve, measuring at least one operating parameter of the internal combustion engine that is connected with a mixture admitted to said engine, and calculating an indicator, by statistical signal processing of at least one measured parameter, and of comparing this indicator against a predetermined value, wherein said calculating an indicator comprises measuring a level of noise corresponding to at least one operating parameter of the internal combustion engine connected with the mixture admitted to said engine, before and after a change in state of the purge valve.

2. The method as claimed in claim 1, wherein the operating parameter of the internal combustion engine is measured at an air intake manifold of the engine.

3. The method as claimed in claim 1, wherein the operating parameter of the internal combustion engine is measured using a lambda probe.

4. The method as claimed in claim 1, further comprising repeating the steps as described above in order to obtain a measurement that is statistically significant.

5. The method as claimed in claim 4, wherein the operating parameter of the internal combustion engine is measured at an air intake manifold of the engine.

6. The method as claimed in claim 4, wherein the operating parameter of the internal combustion engine is measured using a lambda probe.

7. The method as claimed in claim 1, further comprising filtering the level of noise on a studied parameter then integrating this level of noise, over a determined duration after a change in state of the purge valve, then comparing this integrated value against a predetermined threshold.

8. The method as claimed in claim 7, wherein the operating parameter of the internal combustion engine is measured at an air intake manifold of the engine.

9. The method as claimed in claim 7, wherein the operating parameter of the internal combustion engine is measured using a lambda probe.

10. The method as claimed in claim 7, comprising repeating the steps as described above in order to obtain a measurement that is statistically significant.

11. The method as claimed in claim 10, wherein the operating parameter of the internal combustion engine is measured at an air intake manifold of the engine.

12. The method as claimed in claim 10, wherein the operating parameter of the internal combustion engine is measured using a lambda probe.

* * * * *